United States Patent [19]

Eichler et al.

[11] Patent Number: 4,462,908

[45] Date of Patent: Jul. 31, 1984

[54] RAKE LIFTING MEANS FOR SEDIMENTATION APPARATUS

[75] Inventors: Jack H. Eichler, Westport; Stephen A. Landsman, Fairfield, both of Conn.

[73] Assignee: Dorr-Oliver Incorporated, Stamford, Conn.

[21] Appl. No.: 436,305

[22] Filed: Oct. 25, 1982

[51] Int. Cl.³ .............................................. B01D 21/18
[52] U.S. Cl. ..................................... 210/237; 210/531
[58] Field of Search ............... 210/528, 531, 237, 525, 210/523

[56] References Cited

U.S. PATENT DOCUMENTS

| | | | |
|---|---|---|---|
| 2,064,151 | 12/1936 | Coulter | 210/531 |
| 2,305,929 | 12/1942 | Lund et al. | 210/525 |
| 2,437,761 | 3/1948 | Scott | 210/531 |
| 2,837,215 | 6/1958 | Chelminski | 210/531 |
| 3,549,017 | 12/1970 | Theidel et al. | 210/531 |
| 4,172,040 | 10/1979 | Bona et al. | 210/531 |

Primary Examiner—Ernest G. Therkorn
Assistant Examiner—John W. Czaja
Attorney, Agent, or Firm—Burtsell J. Kearns

[57] ABSTRACT

A motorized lifting mechanism for the rake arms of a sedimentation tank which comprise spaced vertical pairs of pivot link arms interconnecting the rake arm frame to a main center rake arm drive cage and wherein the rake arm frame is in turn interconnected to a motorized jack lifting screw by means of a cable to raise the arm upon the pivoting of the pivot arms.

9 Claims, 6 Drawing Figures

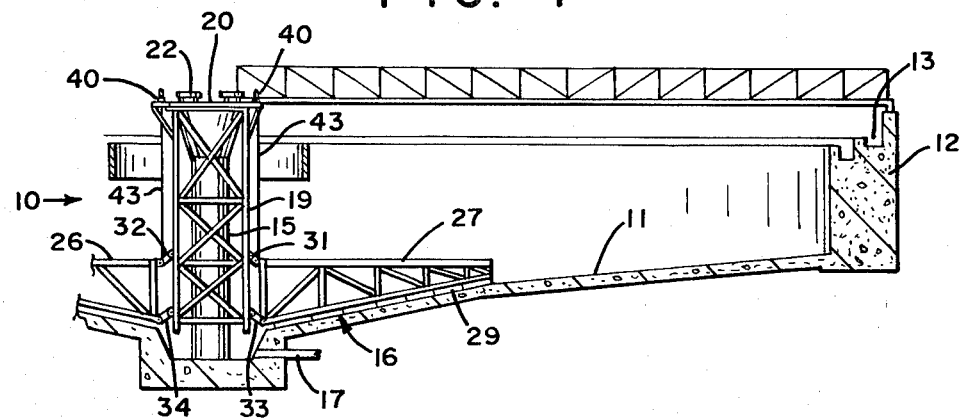
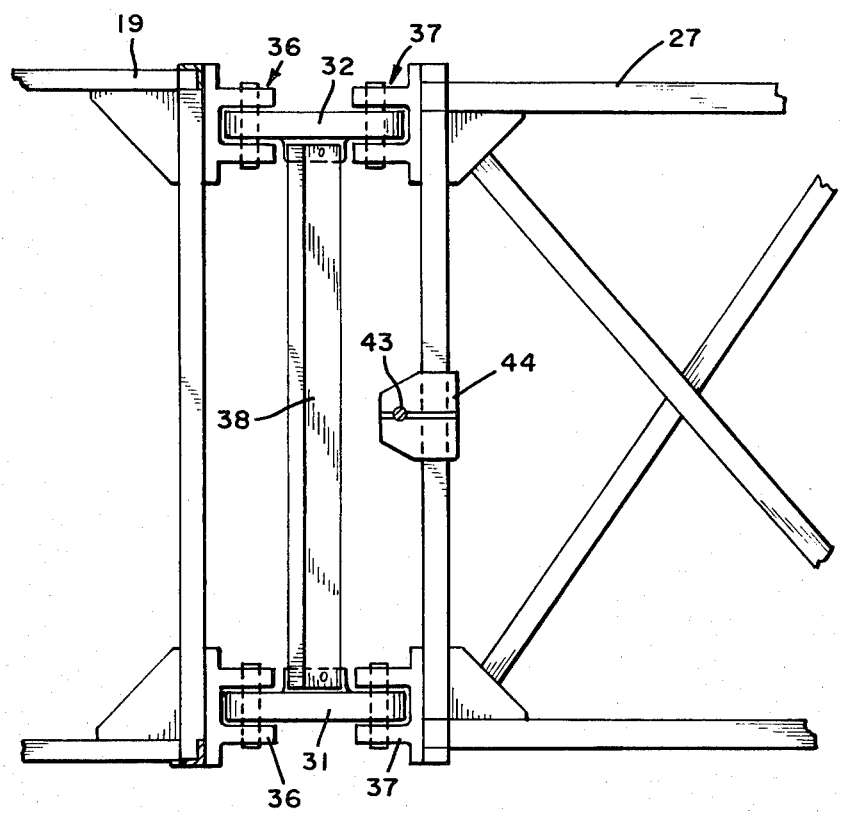

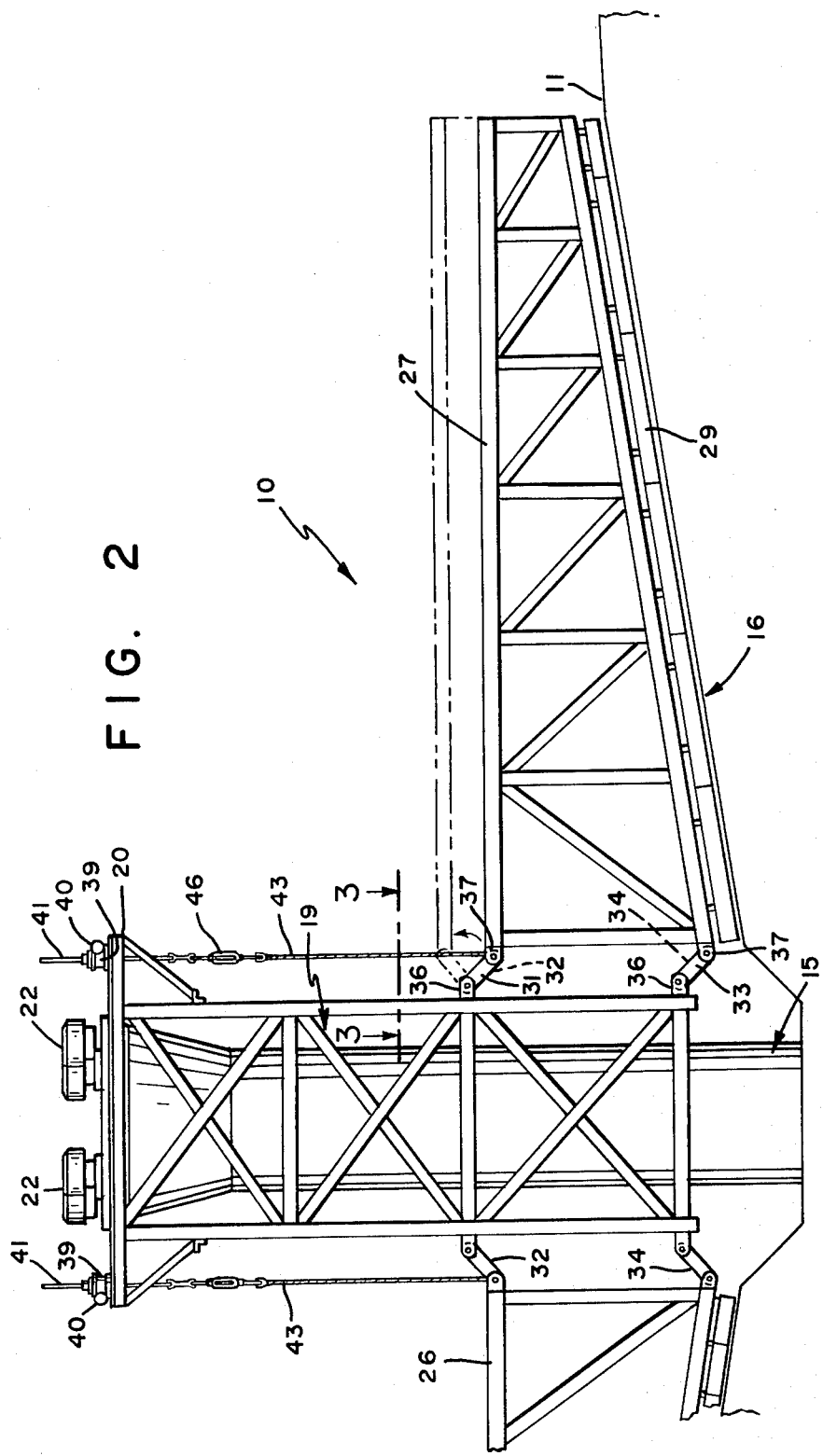

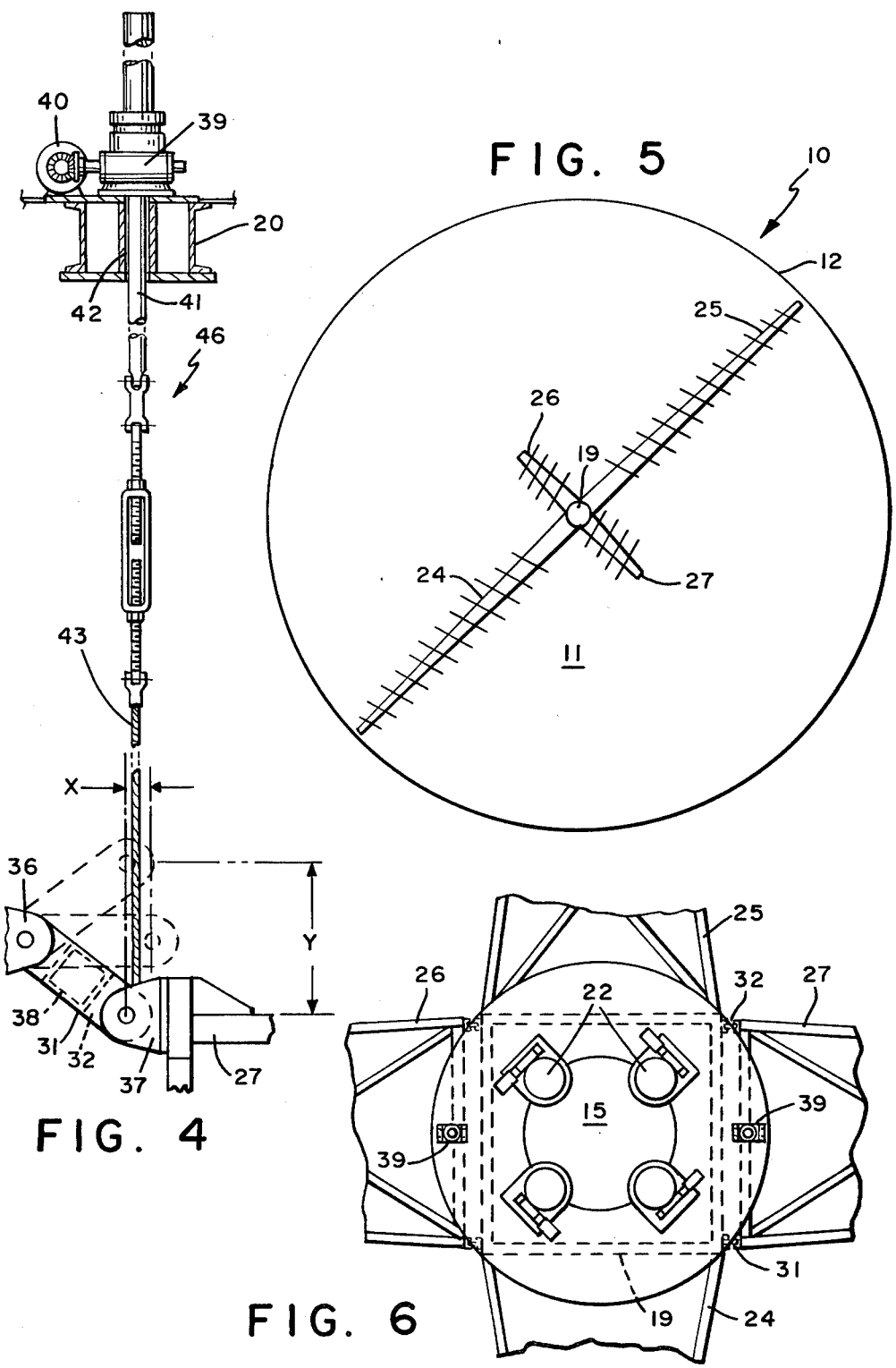

RAKE LIFTING MEANS FOR SEDIMENTATION APPARATUS

BACKGROUND OF THE INVENTION

This invention is directed to new and useful improvements in sedimentation apparatus having rotatable sediment rake arm mechanisms and in particular to rake lifting means for such rake arm mechanisms.

In sedimentation apparatus which comprise circular or square settling tanks it is well known to provide at least one pair of rotating rake arms driven by rotatable drive means which are mounted on a fixed column at the center of the tank. The rake arms are provided with raking blades which are adapted to engage and move sediment or sludge collected on the tank bottom to a central discharge sump. It is common practice to provide means for raising the rake arms should an overload condition exist such as when unusually deep sludge deposits or other obstructions are encountered by the rake blades. The lifting mechanisms are adapted to automatically raise some or all of the rotating rake arms until the overload condition is abated.

Prior art rake arm lifting mechanisms are typified by the the devices disclosed in the following U.S. Pat. Nos.:
867,958
1,734,044
2,064,151
2,122,383
2,437,761
2,557,316
2,650,707
3,200,956
3,549,017

Although the rake lifting mechanisms of these prior disclosures have proven effective for their intended purposes, various problems are encountered in that they include relatively complex structures for raising the rake arm or alternatively do not assure that the rake arms are moved upwardly in manner whereby the inner ends of the rake arms are raised an equidistance from the tank bottom as the outer ends. In the known mechanisms complex hinge arrangements are required resulting in increased torque requirements for lifting of the main drive mechanism with the rake arms or the rake arms alone to accomplish these objectives.

It is an object of the present invention to provide a novel rake lifting mechanism for the rotatable rake arms of a sedimentation settling tank.

Another object is to provide a rake arm lifting mechanism comprised of a novel linkage arrangement between the rake arms and the drive mechanism therefor for raising the rake arms vertically an equidistance from the tank bottom.

A further object is to provide a novel rake lifting mechanism comprised of a relatively few and non-complex parts which require only a minimum operating area for lifting the rake arms a given distance and at the same time reducing torque requirements.

SUMMARY OF THE INVENTION

The present invention contemplates a novel rake lifting mechanism for the rotatable rake arms of a sedimentation settling tank. The rake arms are driven by a vertical cage which is mounted for rotation about the vertical axis of a center pier mounted on the base of the settling tank. The rake arms comprise box shaped frame structures having rake blades at the base thereof for engaging and moving settled sludge or other sediment to a central sump discharge. The inner ends of the rake arm frames are connected to the drive cage by vertically spaced pairs of pivotable link arms. A motorized jack screw is mounted on a platform at the top of the rotating cage assembly and is interconnected to the rake arm frame by means of a cable. Upon encountering an overload condition means are provided for actuating the jack screw to exert a lifting force through the cable to the rake frame to raise the rake arm with the attached rake blades about the pivotable link arms.

The above and other objects and advantages of the present invention will appear more fully hereinafter from a consideration of the detailed description which follows taken together with the accompanying drawings wherein one embodiment of the present invention is illustrated.

IN THE DRAWINGS

FIG. 1 is a fragmentary cross-sectional elevational view of a portion of a sedimentation settling tank which incorporates one embodiment of the present invention and shows one rake arm of the main rake structure;

FIG. 2 is an enlarged elevational view of the rake arm structure of FIG. 1 showing the rake lifting mechanism;

FIG. 3 is a sectional view taken on the line 3—3 of FIG. 2;

FIG. 4 is an elevational view of the rake lifting mechanism;

FIG. 5 is a schematic plan view of a settling tank such as shown in FIG. 1; and

FIG. 6 is a plan view of the center drive mechanism for the rake arm structure.

DETAILED DESCRIPTION

Referring now to the drawings for a more detailed description of the present invention a sedimentation settling tank incorporating an embodiment thereof is generally indicated by the reference numeral 10 in FIG. 1. Settling tank 10 includes a generally conical shaped bottom 11 and a peripheral wall 12 provided with an annular overflow launder 13. A center column 15 or pier comprises a solid footing or cylindrical base portion at the center of tank 10 surrounded by an annular sump discharge zone 16 from which collected sludge is withdrawn or pumped to discharge conduit 17. A square frame cage 19 is supported by a rotatable platform 20 atop center column 15 which is driven by bull gear mechanisms 22 in a well known manner about the vertical axis of column 15.

A rake structure is operatively attached to the base of drive cage 19 and as shown in FIG. 5 comprise a pair of elongated rake arms 24–25 and a pair of short rake arms 26–27. Short rake arms 26 and 27 operate within the inner conical sump zone 16 for moving concentrated solids settled on tank bottom 10 to discharge conduit 17. Elongated rake arms 24 and 25 operate in the outer area of settling tank 10 for raking settled solids to short rake arms 26–27 and are not provided with raking blades in the raking zone of short arms 26–27. For purposes of description the novel rake arm lifting mechanism to be hereinafter described is directed to short rake arms 26 and 27 which will be more apt to encounter overload conditions in the sump discharge zone 16.

Short rake arms 26 and 27 each comprise a box-shaped frame structure having raking blades 29 attached to the bottom of the frame for raking sediment at the bottom of tank 10. As mentioned it is the feature of the present invention to provide novel rake lifting means for rake arms 26 and 27 should one or the other rake arm encounter an overload condition. To this end interconnecting means are provided for connecting the inner ends of arms 26 and 27 to rotatable drive cage 19. Since the interconnecting means for rake arm 26 is the same as for rake arm 27 the description hereinafter set forth will be directed to rake arm 27.

Interconnecting means comprise a pair of upper pivot arms 31-32 (FIG. 3) and a pair of lower pivot arms 33-34. Each pivot arm has one end pivotally connected to hinge fitting 36 on cage 19 and a the other end to corresponding hinge fitting 37 on rake arm frame 27 whereby rake arm 27 is movable in an upward or downward direction designated "Y" in FIG. 4 upon rotation of the pivot arms. A tubular torsion resisting bar 38 is interconnected to each pair of pivot arms to minimize lateral differential displacement of the links.

Means are provided for lifting rake arm 27 and include a lifting device comprised of a worm jack screw 39 driven by a gear motor 40 both mounted on rotatable platform 20. A jack lifting rod 41 of jack screw 39 passes downwardly through an opeing 42 in platform 20 and is interconnected to rake arm frame 27 by an intervening cable member 43 which has one end attached to frame 27 at an attachment plate 44 (FIG. 3) and an opposite end to lifting rod 41. An intermediate turnbuckle 46 is provided on cable 43 the adjustment of which turnbuckle 46 raise or lower rake arm 27 to adjust rake blades 29 a desired distance from tank bottom 11.

An overload alarm system (not shown) of a usual design is provided for settling tank 10 which when an overload situation occurs automatically activates the worm gear jack motor 40 to cause jack screw 39 to move cable 43 upwardly and pivot the pivot arms 31-32 and 33-34 the distance designated "Y" in FIG. 4. Motion is transmitted through the cables 43 to raise the rake arms 26-27. The center drive cage 19 and long rake arms 24 and 25 maintain their normal operable positions. When the overload system is relieved the lifted rake arms 26 and 27 will lower automatically on pivot arms 31-32 and 33-34. If the overload should continue appropriate controls are provided in a well-known manner to shut down operation of the entire machine.

As will be appreciated from the foregoing description the novel rake lifting mechanism described has many advantages in use. Among other advantages is the fact that the lifting mechanism is comprised of a minimum number of parts and operating area does not interfere with the operation of the main rake arms 24 and 25. Further the novel pivot link arrangement is effective to lift the inner and outer ends or rake arms 26 and 27 an equal distance with only minor lateral movement of cable 43 a distance designated "X" in FIG. 4. As will be appreciated the pivot links acting in unison provide a vertical lifting force without rotation in a vertical plane. Thus a vertical force of the same given magnitude can be applied at any point on the rake arm to raise the arm. If desired links of unequal lengths could be used whereby blades 29 could be caused to be raised unequal distances if desired in a given application.

Although one embodiment of the present invention has been described in detail, it is to be expressly understood that the invention is not limited thereto. Various changes can be made in the design and arrangement of parts without departing from the spirit and scope thereof as the same will now be understood by those skilled in the art.

What is claimed is:

1. A sedimentation apparatus including a settling tank for separating solids from a liquid-solids suspension, a settled solids collecting zone on the tank bottom, a rotary rake mechansim effective to move the settled solids on said tank bottom to said settled solids collecting zone for discharge from said tank, said rotary rake mechanism comprising
   (a) at least a pair of rake arms each having blades at the bottom thereof adapted to engage the settled solids on the tank bottom,
   (b) support means mounting said rake arms for rotation about a vertical axis at the center of said settling tank,
   (c) rake lifting means interconnected to said rake arms and to said rake arm support means,
   (d) said rake lifting means including dual pairs of vertically spaced and parallel pivot arms for each of said rake arms, each pviot arm of a pair of said pivot arms being horizontally spaced one from the other, and each having a hinge connection to said rake arm and to said support means and
   (e) actuating means to move said dual pair of pivot arms of a rake arm about said hinge connection in unison to raise or lower said rake arm in a vertical plane relative to said tank bottom.

2. The sedimentation apparatus of claim 1 wherein said support means comprises a vertical column member fixed at the center of said bottom wall and a vertical cage assembly supported by and rotatable about the vertical axis of said column.

3. The device of claim 2 wherein a platform is provided at the top of said vertical cage assembly, and wherein said actuating means for said rake lifting means comprise a motorized jack screw mounted on said platform and means interconnecting a lifting rod of said jack screw to said rake arm.

4. The device of claim 3 wherein said means interconnecting said lifting rod to said rake arm comprises a non-rotatable cable having one end connected to the rake arm frame and the other end to said lifting rod.

5. The device of claim 4 wherein adjusting means are provided on said cable interconnecting means to fix the position of the rake arm blades relative to said tank bottom.

6. The device of claim 5 wherein said adjusting means include an adjustable turnbuckle.

7. The sedimentation apparatus of claim 2 wherein said rake arms each comprise a frame structure and wherein said dual pairs of pivot arms therefor comprise link members having first ends connected to a hinge on said vertical cage assembly and second opposite ends connected to hinges on said rake arm frame.

8. The device of claim 7 wherein a torsion resisting bar is interconnected between each pair of pivot arms.

9. The device of claim 7 wherein all of said pivot links are of the same length whereby said rake blades are raised an equidistance from said tank bottom upon actuation of said lifting means.

* * * * *